May 16, 1944.  R. J. BRITTAIN, JR  2,349,073
RAILWAY JOURNAL BOX
Filed Jan. 14, 1943   2 Sheets-Sheet 1
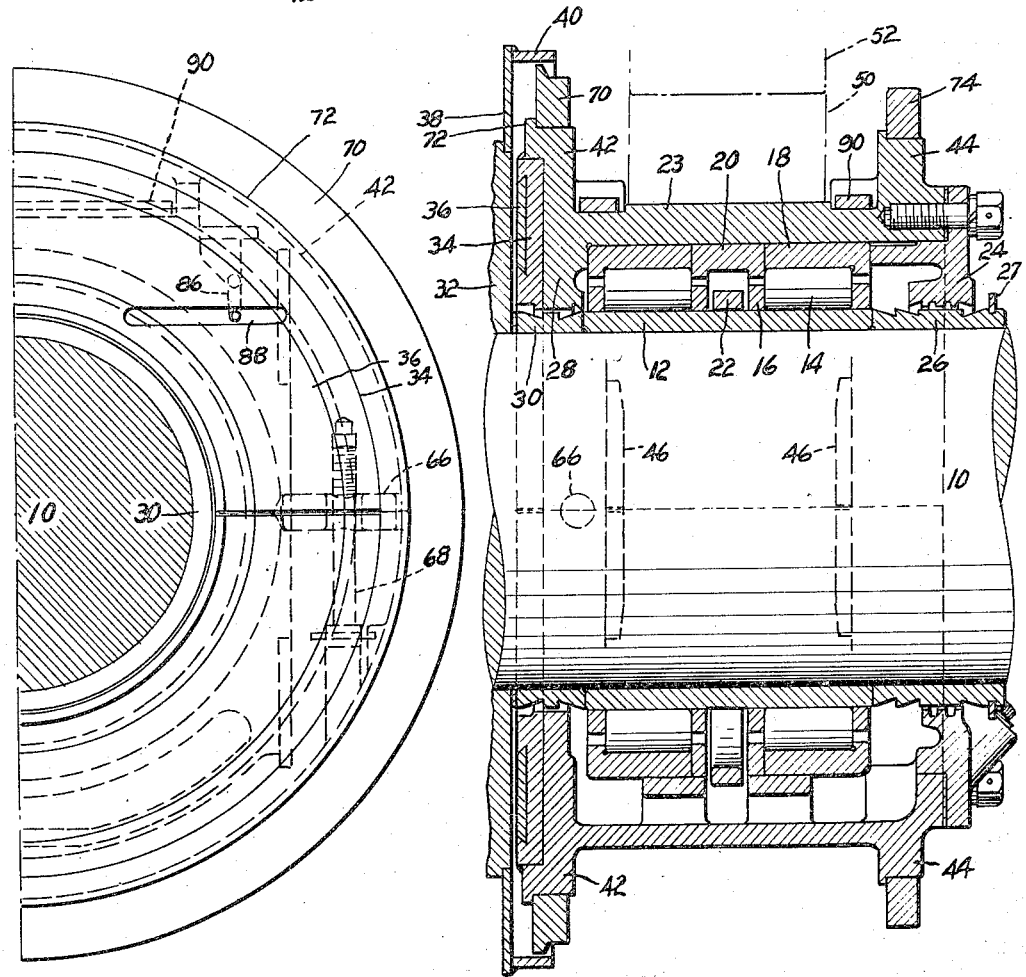
INVENTOR:
RICHARD J. BRITTAIN JR.
BY Romeyn A. Spare
HIS ATTORNEY.

Patented May 16, 1944

2,349,073

UNITED STATES PATENT OFFICE 2,349,073

RAILWAY JOURNAL BOX

Richard J. Brittain, Jr., Bloomfield, N. J., assignor to General Motors Corporation, Detroit, Mich., a corporation of Delaware Application January 14, 1943, Serial No. 472,345

3 Claims. (Cl. 105—79)

This invention relates to railway journal boxes and comprises all of the features and aspects of novelty herein disclosed. An object of the invention is to provide an improved journal box for locomotive driving axles and the like. Another object is to provide improved means for securing together the sections of a divided journal box especially in a locomotive driving box wherein large forces are encountered and wherein the wheel hub and the car frame pedestals lie very close to one another. To these ends and also to improve generally upon devices of this character, the invention consists in the various matters hereinafter described and claimed. In its broader aspects, the invention is not necessarily limited to the specific construction selected for illustrative purposes in the accompanying drawings in which Fig. 1 is a vertical longitudinal sectional view of the box.

Fig. 2 is one half of an end view of Fig. 1, the wheel hub being removed.

Fig. 3 is a horizontal longitudinal sectional view.

Figure 4:
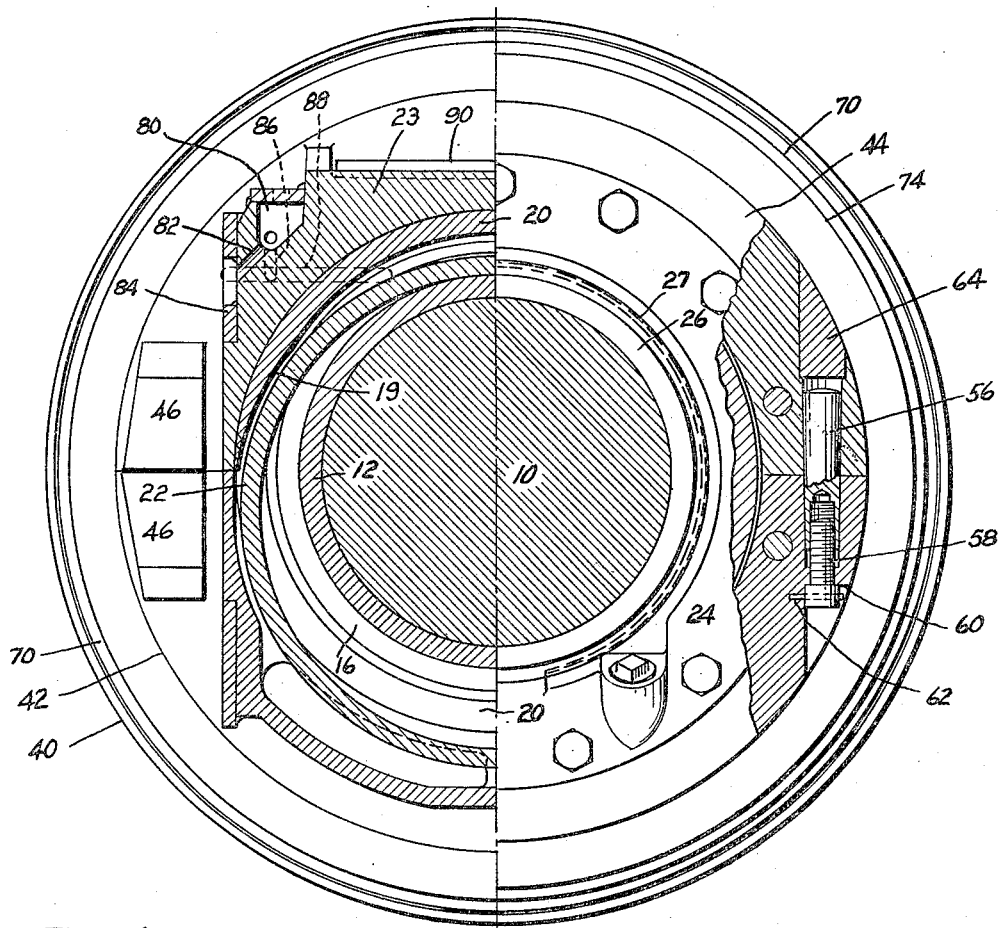
Fig. 4 is one half a sectional view across the middle of the box, the other half being an end view with a portion broken away and in section.

A driving axle 10 receives a raceway sleeve 12 for two rows of roller bearings 14, each row having a separator 16 and running in a flanged outer race ring 18, the two outer race rings being separated by a spacing sleeve 20 of channel shaped cross section above the axle. A portion of the sleeve is cut away at 19 above the axle and the entire bottom of the channel is cut away below the axle to make room for an oiling ring 22 which is supported on the raceway sleeve 12 in eccentric position to dip into an oil reservoir at the bottom of the box to thereby lift oil to the bearings. The race rings 18 fit in the bore of a horizontally divided journal box 23. One end of the box is closed by a bolted-on end cap 24 which has grease grooves around a sleeve 26 which is pressed on the axle and provided with slingers. A split ring 27 in a groove of the sleeve 26 will prevent the box from sliding along the axle when box and axle are not horizontal as when those parts are lifted by a crane. The other end of the box has a radial wall 28 surrounding a sleeve 30 which spaces the sleeve 12 from a wheel hub 32. A two-part bronze ring 34 dovetailed for an insert 36 is welded to the wall 28 and serves as a thrust surface against which the wheel hub will rub at times. A ring 38 is welded to the hub and carries a shield 40 surrounding a holding ring hereinafter referred to.

The frame pedestals and the liners of a locomotive drive box lie so close to the wheel hub that there is insufficient room in the intervening space to provide bolts of adequate size to secure the sections of a divided box together against the large forces encountered in use. If the bolts were made large, the box sections would have to have such large bolt holes as to unduly weaken the box. Accordingly I provide substantially continuous circular flanges to extend outwardly all around the box and utilize small bolts and taper pins chiefly to locate the box sections while other adequate holding means hereinafter described are placed around the flanges. To these ends, each box section is provided with a projecting arcuate flange 42 at the wheel end, the two flanges being in alignment crosswise of the box and jointly forming a continuous circular flange projecting outwardly around the whole circumference of the box. Another similar pair of arcuate flanges 44 of slightly smaller diameter jointly form another circular flange around the box near the other end. Where these flanges are spaced apart at the opposite sides of the box, they serve as pedestal guideways to which liners 46 are welded, these liners co-operating with the legs of U-shaped pedestal liners 48 which are secured to the usual pedestals 50 of a locomotive frame 52.

The smaller pedestal flange 44 is bored vertically at each side as indicated in Fig. 4 to receive a tapered drive pin 56 which is internally threaded at its lower end to receive a tension bolt 58 whose head bears upwardly against a shoulder 60 cut in the lower box section. Each bolt is secured by a locking pin 62 and the opening above the tapered pin is closed by a plug 64. At the larger pedestal flange 42, the box sections have mating grooves receiving short transverse locating pins 66 to locate the sections in registration. The pins are spaced apart so that a bolt 68 can be passed upwardly through the lower box section for threaded engagement in the upper section. These fastenings are preliminary or auxiliary locating and securing means. When the box sections are in registration, a narrow but radially deep heated ring 70 of continuously circular form is passed over the smaller pedestal flange 44 onto the larger flange 42 where it is located axially on its seat by a little rib 72. Upon cooling, the ring tightly holds the box sections together. Another ring 74 is similarly engaged with the smaller flange 44. A gas ring may be conveniently used to heat and expand the rings for assembly or removal.

As indicated in Fig. 4, a cavity 80 at each side of the upper box section forms a lubricant reservoir to deliver lubricant through an inclined port 82 to an opening in a wear plate 84 welded to the side of the box. The wear plate 84 and a similar one on the lower box section co-operate with the adjacent pedestal liner 48. Each lubricant reservoir also has a second inclined port 86 leading to a groove 88 crossing the insert 36 to provide lubricant for the thrust surface which is engaged by the wheel hub. Across the top of the box are two spaced grooves receiving seat plates 90 on which the usual frame-embracing spring saddle or yoke will rest to transmit load from the frame to the box.

I claim:

1. In a locomotive driving box, a pair of mating box sections, an axle journalled in the box, a wheel secured to the axle at one end of the box, a frame having pedestals at opposite sides of the box, the pedestals being located so close to the wheel as to preclude adequate bolting together of the box sections in the intervening space, the box sections having arcuate flanges jointly forming a substantially continuous narrow circular flange projecting outwardly all around the box and passing through the narrow space between the pedestals and the wheel, those portions of the flanges at opposite sides of the box forming pedestal guides, and a holding ring surrounding the circular flange.

2. In a locomotive driving box, a pair of mating box sections, an axle journalled in the box, a wheel secured to the axle at one end of the box, a frame having pedestals at opposite sides of the box close to the wheel, the box sections having arcuate flanges forming a narrow substantially circular flange projecting outwardly all around the box and passing through the narrow space between the pedestals and the wheel, a ring surrounding the circular flange, and a second flange and surrounding ring around the box at the opposite side of the pedestals, the adjacent sides of the circular flanges forming pedestal guides.

3. In a locomotive driving box, a pair of mating box sections, an axle journalled in the box, a wheel secured to the axle at one end of the box, a frame having pedestals at opposite sides of the box close to the wheel, the box sections having arcuate flanges jointly forming a narrow substantially circular flange projecting outwardly all around the box and passing through the narrow space between the pedestals and the wheel, a ring surrounding the circular flange, and a second flange and surrounding ring around the box at the opposite side of the pedestals, the second flange being of smaller diameter than the first to provide for assembly of both rings axially over the same end of the box.

RICHARD J. BRITTAIN, Jr.